US011964283B2

(12) United States Patent
Moreno et al.

(10) Patent No.: US 11,964,283 B2
(45) Date of Patent: Apr. 23, 2024

(54) LIFTER BAR

(71) Applicant: Vulco S.A., Santiago (CL)

(72) Inventors: Victor Moreno, Santiago (CL); Hector Lara, Santiago (CL); Alonso Pinto, Santiago (CL)

(73) Assignee: Vulco S.A. (CL)

( * ) Notice: Subject to any disclaimer, the term of this patent is extended or adjusted under 35 U.S.C. 154(b) by 449 days.

(21) Appl. No.: 17/417,998

(22) PCT Filed: Dec. 13, 2019

(86) PCT No.: PCT/IB2019/060751
§ 371 (c)(1),
(2) Date: Jun. 24, 2021

(87) PCT Pub. No.: WO2020/136488
PCT Pub. Date: Jul. 2, 2020

(65) Prior Publication Data

US 2022/0088609 A1 Mar. 24, 2022

(30) Foreign Application Priority Data

Dec. 28, 2018 (GB) ...................................... 1821262

(51) Int. Cl.
*B02C 17/00* (2006.01)
*B02C 17/18* (2006.01)
*B02C 17/22* (2006.01)

(52) U.S. Cl.
CPC ........ *B02C 17/1825* (2013.01); *B02C 17/225* (2013.01)

(58) Field of Classification Search
CPC .......................... B02C 17/1825; B02C 17/225
See application file for complete search history.

(56) References Cited

U.S. PATENT DOCUMENTS

| | | | | |
|---|---|---|---|---|
| 3,934,828 A * | 1/1976 | Persson | B02C 17/225 241/300 |
| 4,289,279 A * | 9/1981 | Brandt | B02C 17/225 241/102 |
| 4,848,681 A * | 7/1989 | Eriksson | B02C 17/225 241/300 |
| 5,431,351 A * | 7/1995 | Lejonklou | B02C 17/225 241/299 |
| 5,472,148 A | 12/1995 | Schaeffer | |

(Continued)

FOREIGN PATENT DOCUMENTS

| | | | |
|---|---|---|---|
| CN | 203916807 U | 11/2014 |
| EP | 1279438 A1 | 1/2003 |

(Continued)

*Primary Examiner* — Faye Francis
(74) *Attorney, Agent, or Firm* — Morriss O'Bryant; Compagni Cannon, PLLC.

(57) ABSTRACT

A lifter bar for a grinding mill includes an elongate structural support defining a longitudinal axis and extending from (i) a first end transverse to the longitudinal axis to (ii) a second end transverse to the longitudinal axis; a plurality of structural plates extending along the longitudinal axis in spaced relation, where each structural plate is transverse to the longitudinal axis, and defines opposed edges. The lifter bar may further include at least two protective plate portions, each protective plate portion being mounted over one set of the opposed edges.

20 Claims, 8 Drawing Sheets

(56) References Cited

U.S. PATENT DOCUMENTS

| | | | | |
|---|---|---|---|---|
| 9,475,058 | B2 * | 10/2016 | Town .................... | B02C 17/225 |
| 2011/0073694 | A1 | 3/2011 | Timm et al. | |
| 2011/0186670 | A1 * | 8/2011 | Town .................... | B02C 17/225 264/269 |
| 2016/0067715 | A1 * | 3/2016 | Lauermaa ........... | B02C 17/1825 29/402.18 |

FOREIGN PATENT DOCUMENTS

| | | | |
|---|---|---|---|
| GB | 1158565 | A | 7/1969 |
| RU | 2546883 | C1 | 4/2015 |
| WO | 2010017589 | A1 | 2/2010 |
| WO | 2011150531 | A1 | 8/2011 |

* cited by examiner

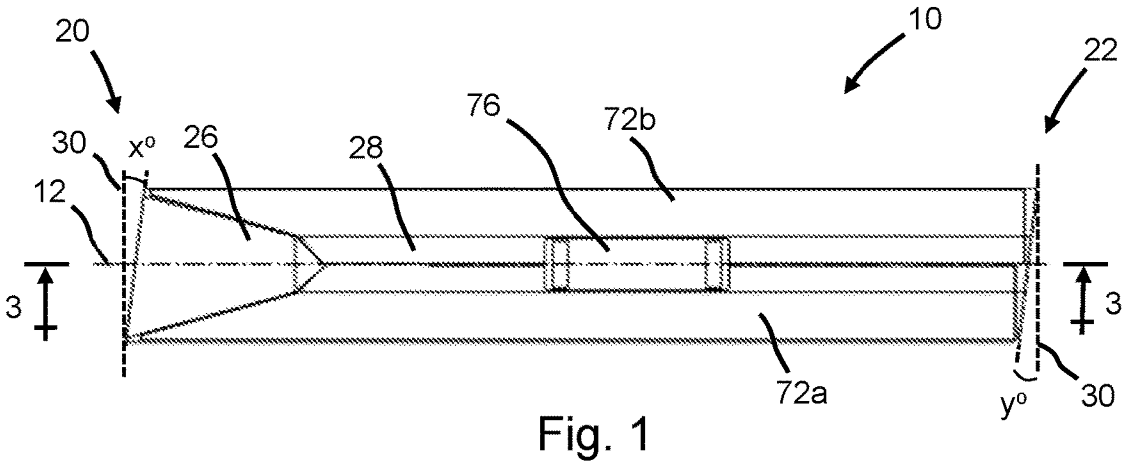
Fig. 1
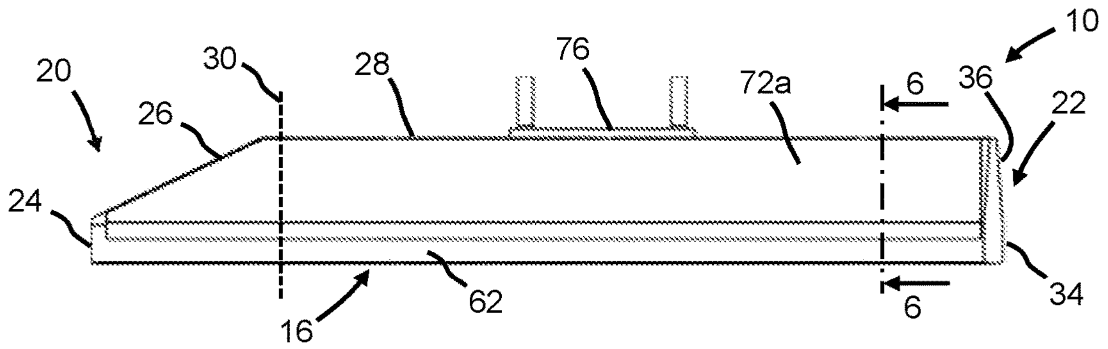
Fig. 2
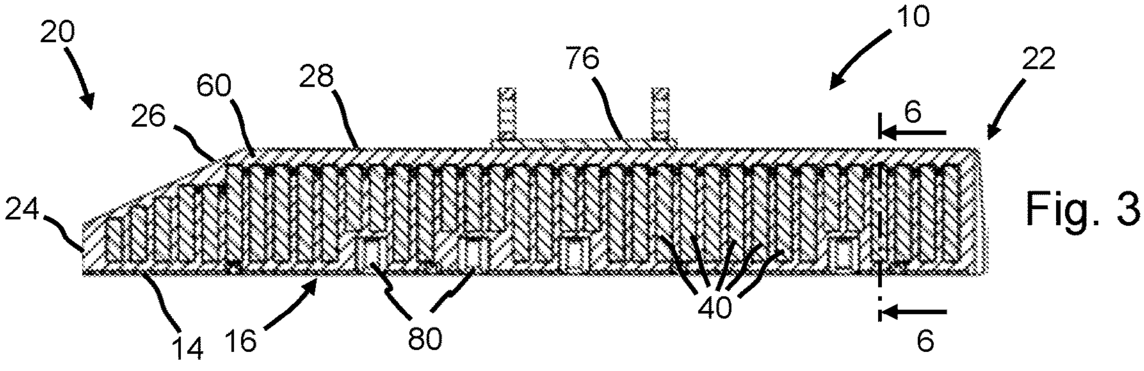
Fig. 3
Fig. 3

LIFTER BAR

The present invention relates generally to crushing, grinding, comminuting or similar processing of materials such as mineral ores, rock and other materials, and more particularly to apparatus for use in such processing.

Grinding mills are one form of apparatus used for processing materials as described above. Typical grinding mills generally comprise a drum-shaped shell mounted for rotation about its central axis. The axis of the shell is generally horizontally disposed or slightly inclined towards one end. The interior of the shell forms a treatment chamber into which the material to be processed is fed.

In one form of mill known as a SAG (semi autogenous grinder) a grinding medium such as balls or rods is fed to the treatment chamber (i.e. the inside of the shell) with the material to be processed. During rotation of the shell the grinding medium acts on the material to cause the crushing or grinding action. The grinding medium and material to be processed are carried up the side of the shell as a result of the centrifugal force created by rotation of the shell, and then afterwards it falls towards the bottom of the shell under the influence of gravity.

To assist in lifting the material up the side of the shell, lifter bars are often provided, which are secured to the interior surface of the shell. The lifter bars extend generally longitudinally along the shell and are circumferentially spaced apart around the inner surface. The higher the material travels up the shell the better the grinding of the material.

Lifter bars may take the form of a conventional lifter bar or a so-called monoblock lifter. A monoblock lifter comprises a central lifter section (similar to a conventional lifter bar) and a lateral extension on one or both sides thereof. The lateral extensions may be significantly lower than the height of the central lifter section, or may be almost as high or the same height as the central lifter section.

In one form, lifter bars for grinding mills comprise an elongate structural support (typically in the form of a metal insert bar extending the length of the lifter bar) and having structural supports upstanding therefrom and extending longitudinally along the lifter bar, all enclosed by an elastomeric material. During operation of the grinding mill, the surface of the lifter bars is worn away by the action of the material being ground down, so lifter bars typically include anti-abrasive steel plates or other abrasion resistant plates on or near outer surfaces thereof.

Lifter bars are subjected to significant stresses and strains, which may result in bending or other distortion of the lifter bar, thereby reducing the effectiveness of the lifter bar.

It is among the objects of some embodiments of the present invention to mitigate the above or other disadvantages associated with prior art lifter bars.

According to a first aspect there is provided a lifter bar for a grinding mill, the lifter bar comprising: an elongate structural support defining a longitudinal axis and extending from (i) a first end transverse to the longitudinal axis to (ii) a second end transverse to the longitudinal axis; a plurality of structural plates extending along the longitudinal axis in spaced relation, where each structural plate is transverse to the longitudinal axis, and defines opposed edges; and an elastomer enclosure surrounding the plurality of structural plates and at least partially surrounding the elongate structural support, to prevent the structural plates from being directly impacted by a grinding medium when used in a grinding mill.

A top protective plate portion may be mounted over a top surface of the elastomer enclosure over the structural plates. The lifter bar may further comprise at least two protective plate portions, each protective plate portion being mounted over one set of the opposed edges of the structural plates.

Each structural plate may be generally parallel to an adjacent structural plate. Each structural plate may comprise front and back major surfaces, where the front and back major surfaces are transverse to the longitudinal axis.

Preferably, there are at least five transverse structural plates disposed in the lifter bar and spaced along the longitudinal axis; advantageously, at least ten transverse structural plates are disposed in the lifter bar and spaced along the longitudinal axis. In some embodiments, 15, 20, 25, 30 or more transverse structural plates may be disposed in the lifter bar.

The transverse structural plates may not be evenly distributed along the length of the lifter bar. The transverse structural plates may only be disposed along a full height portion (or full height portions, but of different full heights) of the lifter bar (i.e. not a sloping portion).

The elongate structural support may comprise a rigid sheet, such as a metal or alloy bar, or a composite material.

Each structural plate may be orientated at an angle to a plane normal to the longitudinal axis. In some embodiments, this angle is less than 16 degrees to the plane normal to the longitudinal axis; in other embodiments, angle may be less than 13 or 11 degrees to such a plane. In other embodiments each structural plate may be orientated at a small angle to a plane. This small angle may be less than five degrees to such a plane. In some embodiments, each structural plate is orientated parallel to a plane normal to the longitudinal axis. In some embodiments, each structural plate may be angled by a slightly larger angle than the previous structural plate along the longitudinal axis.

The elastomer enclosure and the rigid sheet may, in combination, to provide the elongate structural support.

The opposed edges may comprise one or more sloping edges.

The top surface may be located where the opposed edges are closest together.

The elongate structural support may define recesses in a lower surface (or underside) thereof into which couplings may be mounted to facilitate lifting or securing in place of the lifter bar.

The lifter bar may comprise support stubs spaced along the elongate structural support, and a longitudinal support rail mounted thereon and supporting the structural plates. The longitudinal support rail may be parallel to the elongate structural support.

Each structural plate may have a frusto-triangular shape (with or without rounded lower edges).

The lifter bar may further comprise a first runner (or lateral portion) extending (i) outwardly from a lower part of a protective plate portion mounted over one set of the opposed edges and (ii) generally parallel to the longitudinal axis.

The lifter bar may further comprise a second runner (or lateral portion) on an opposite side of the longitudinal axis to the first runner and extending (i) outwardly from a lower part of a protective plate portion mounted over another set of the opposed edges and (ii) generally parallel to the longitudinal axis.

These two runners may be in the form of wings extending laterally from a central portion of the lifter bar.

The lifter bar may further comprise a second set of transverse structural plates, where a transverse structural plate from the first set of transverse plates is aligned with a corresponding transverse structural plate from the second set of transverse plates in the same plane, but mutually spaced apart.

The lifter bar may further comprise a first support rail and a second support rail on which the first set of transverse structural plates are mounted.

Alternatively, the first set of transverse structural plates are mounted on the first support rail and the second set of transverse plates are mounted on the second support rail.

The lifter bar may comprise a front portion having a first height, and a rear portion having a different (second) height. The front portion may comprise one or two sets of transverse plates; the rear portion may also comprise one or two sets of transverse plates; the front and rear transverse plates may be longitudinally aligned or longitudinally offset.

The lifter bar may further comprise one or more protective plate portions mounted on each runner to provide resistance to abrasion or other wear during use.

The lifter bar may further comprise a handle including lifting eyelets to enable the lifter bar to be lifted and moved into place in a grinding mill, or removed from the grinding mill. The handle may be located on an upper surface of the lifter bar or on one or more protective plates on a side of the lifter bar.

The lifter bar may further comprise a central support at one or both ends thereof. The central support may have an upper surface having a profile matching a profile of an end at which the central support is located. The central support may be axially aligned with the lifter bar longitudinal axis and may extend longitudinally therealong. The central support may extend at least 50% (in some embodiments, at least 60%, 70% or 80%) of the height of the lifter bar.

The lifter bar may further comprise one or more support arms adjacent the central support. The support arms may extend at least 30% (in some embodiments, at least 35%, 40%, 50% or 60%) of the height of the central support and may extend longitudinally parallel to the lifter bar longitudinal axis.

According to a second aspect there is provided a grinding mill comprising (i) a rotatable shell, (ii) a plurality of lifter bars according to the first aspect mounted on an inner surface of the shell in circumferentially spaced relation, and (iii) at least one shell liner mounted between adjacent lifter bars according to the first aspect.

The shell liner may define a flat or arcuate (for example, concave) upper surface.

The grinding mill may further comprise at least one conventional liner bar mounted between adjacent lifter bars according to the first aspect.

The rotatable shell may comprise mounting points on an outer surface thereof to secure the lifter bars to the shell, for example, the mounting points may include bolts for insertion into the recesses in the lifter bar underside.

According to a third aspect there is provided a grinding mill comprising a plurality of lifter bars according to the first aspect and a plurality of conventional lifter bars, where at least one conventional lifter bar is mounted in the grinding mill adjacent, but in circumferentially spaced relation, to each lifter bar according to the first aspect.

The grinding mill may comprise a plurality of lifter bars according to the first aspect mounted adjacent each other so that such lifter bars are longitudinally aligned.

According to a fourth aspect there is provided a lifter bar comprising a raised portion, and a lateral portion extending from a lower side of the raised portion, the raised portion including a plurality of parallel structural plates arranged therein.

The structural plates may be arranged in a row, with a major surface of one or each structural plate being parallel to an adjacent structural plate and transverse to a longitudinal axis of the lifter bar.

Each structural plate may have a frusto-triangular shape (with or without rounded lower edges).

The structural plates may be mounted on a support rail spaced from an elongate longitudinal support by spaced support stubs.

The raised portion may include a plurality of protective plate portions mounted thereon to provide protection against abrasion, for example, from slurry. The raised portion may include a handle affixed to a protective plate portion nearest the lateral portion. The handle comprises lifting eyelets.

According to a fifth aspect there is provided a lifter bar for a grinding mill, the lifter bar comprising: an elongate structural support defining a longitudinal axis and extending from (i) a first end transverse to the longitudinal axis to (ii) a second end transverse to the longitudinal axis; a plurality of fully enclosed structural plates extending along the longitudinal axis in spaced relation, where each structural plate is transverse to the longitudinal axis, and defines opposed edges; thereby preventing the structural plates from being directly impacted by a grinding medium when used in a grinding mill.

The various aspects detailed hereinafter are independent of each other, except where stated otherwise. Any claim corresponding to one aspect should not be construed as incorporating any element or feature of the other aspects unless explicitly stated in that claim.

By virtue of one or more of these aspects, an improved lifter bar is provided that reduces bending and torsional effects due to the presence of the transverse structural plates. Surrounding the transverse structural plates with elastomer and, optionally, protective plates, means that when the lifter bar is used within a grinding mill, the direct impact of the balls (or other grinding medium) is taken by the elastomer enclosure (or protective plates, if used), not by the structural plates.

These and other aspects will be apparent from the following specific description, given by way of example only, with reference to the accompanying drawings, in which:

FIG. 1 is a simplified, schematic plan view of a lifter bar according to a first embodiment of the present invention;

FIG. 2 is a simplified, schematic front elevation view of the lifter bar of FIG. 1;

FIG. 3 is a simplified, schematic cross-sectional elevation view (along lines 3-3 in FIG. 1) of the lifter bar of FIGS. 1 and 2;

Figure 4:
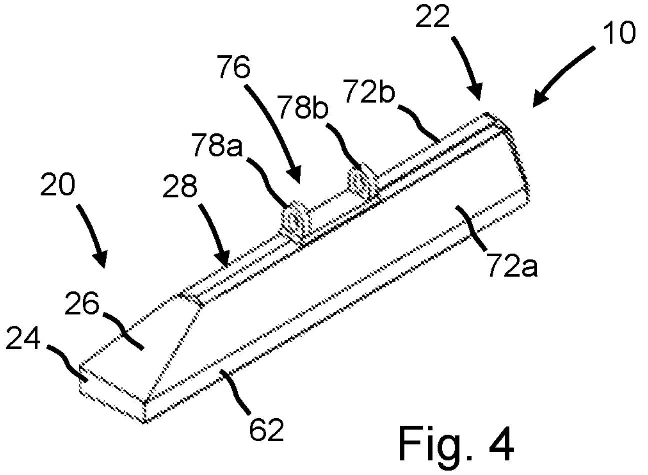
FIG. 4 is a simplified, schematic perspective view of the lifter bar of FIGS. 1 to 3.
Figure 5:
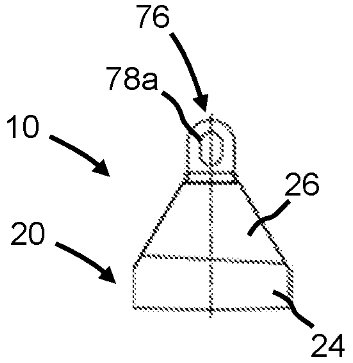
FIG. 5 is a simplified side view of the lifter bar of FIGS. 1 to 4.
Figure 6:
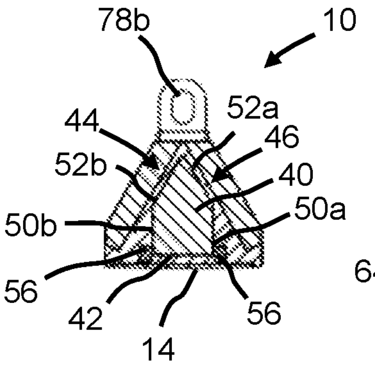
FIG. 6 is a simplified cross-sectional side view (along lines 6-6) of the lifter bar of FIGS. 1 to 5.
Figure 7A:
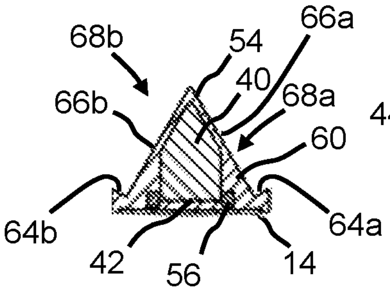
Figure 7B:
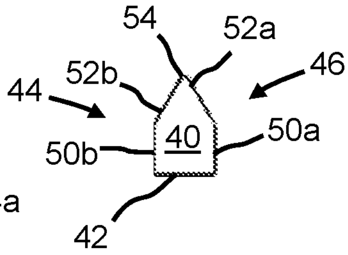

FIG. 7*a* is a simplified view of FIG. 6 with parts (protective steel covers) removed therefrom;

FIG. 7*b* is a simplified view of FIG. 7*a* showing just one part (the support plate)

Figure 8:
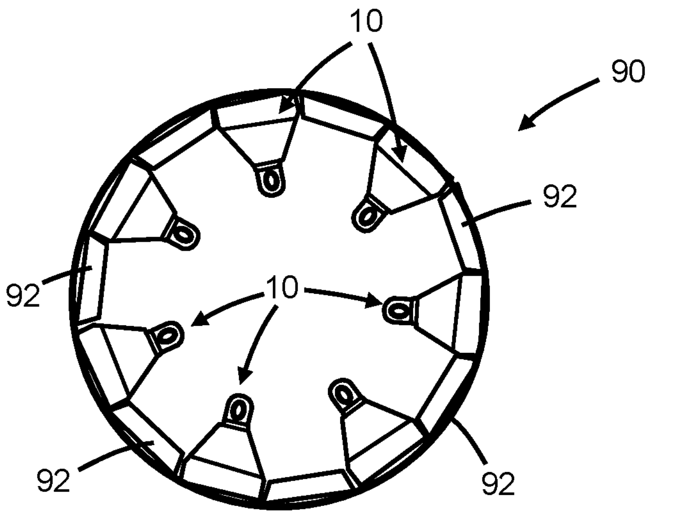
Figure 9:
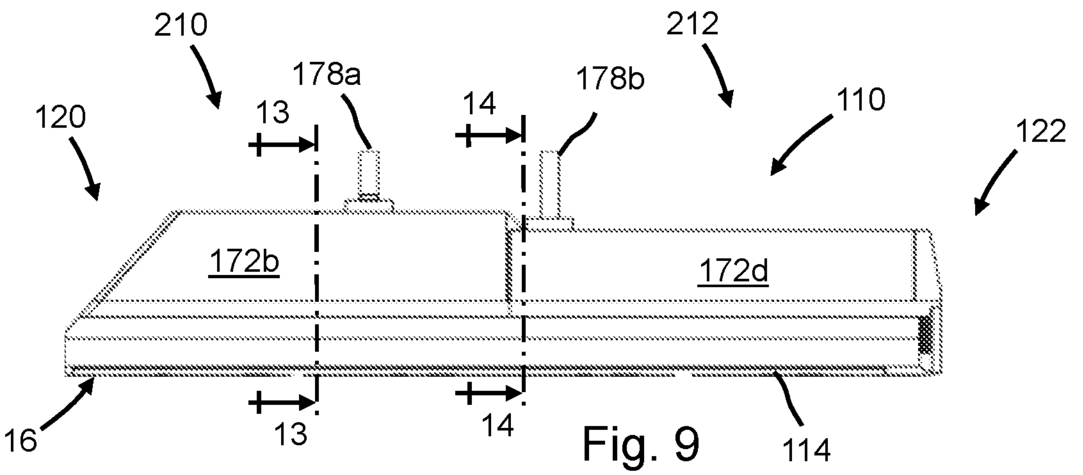
Figure 10:
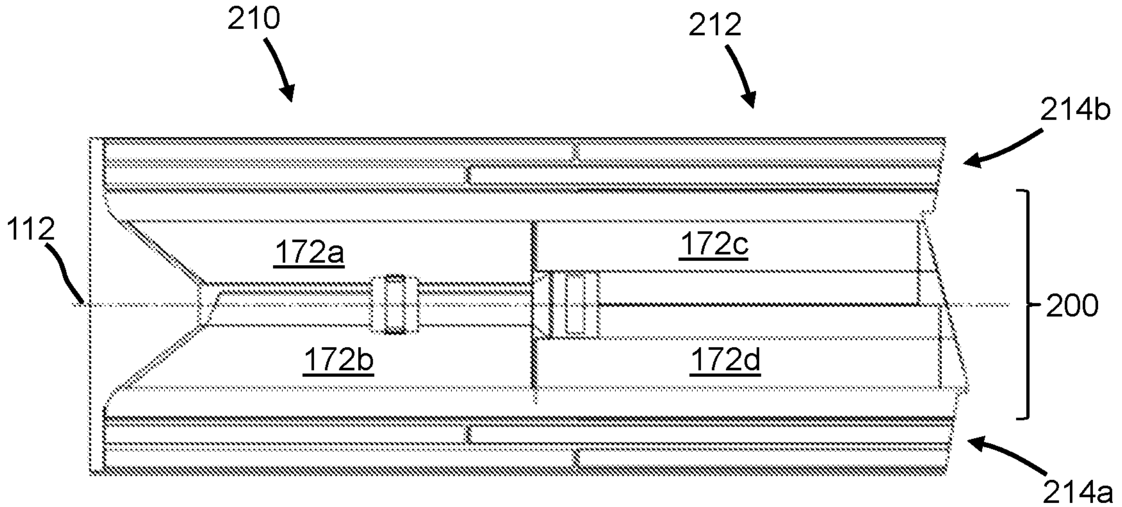
Figure 11:
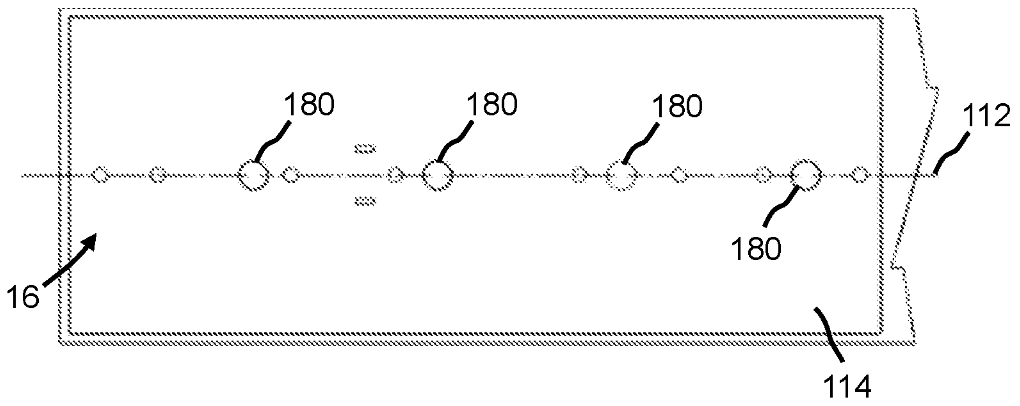
Figure 12:
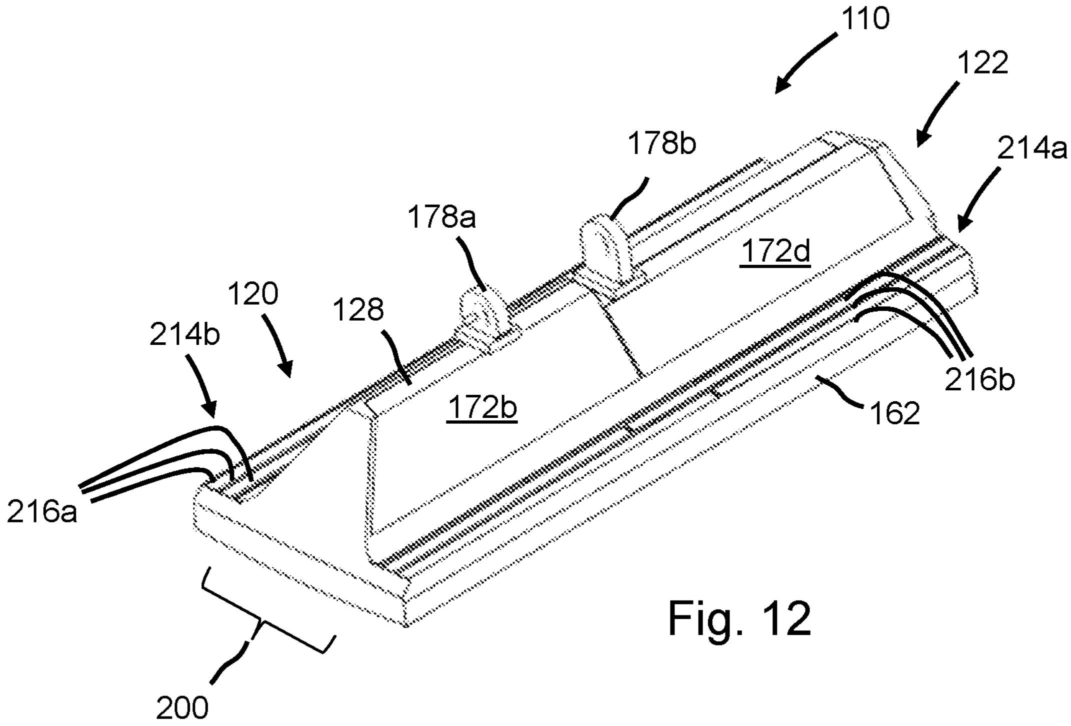
Figure 13A:
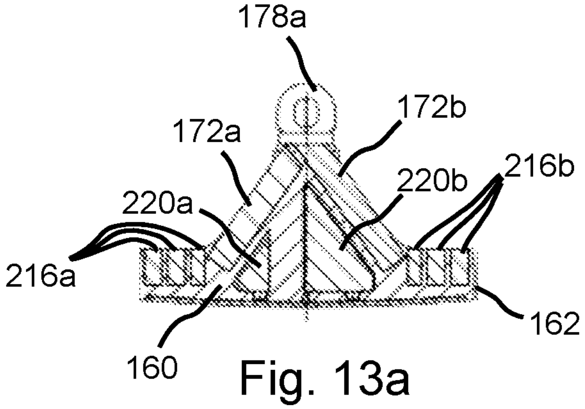
Figure 13B:
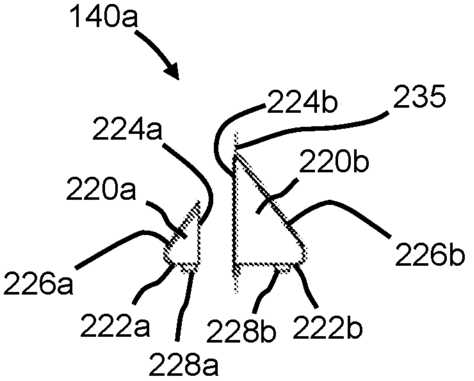

FIG. 8 is a simplified, schematic side view of a grinding mill shell including a plurality of circumferentially spaced lifter bars of the type shown in FIGS. 1 to 7, mounted on an inner surface thereof, according to a second embodiment of the present invention;

FIG. 9 is a schematic side view of a lifter bar (a so-called monoblock bar) according to a third embodiment of the present invention;

FIG. 10 is a schematic plan view of the lifter bar of FIG. 9;

FIG. 11 is a schematic underside view of the lifter bar of FIGS. 9 and 10;

FIG. 12 is a schematic perspective view of the lifter bar of FIGS. 9 to 11;

FIG. 13*a* is a simplified, schematic cross-sectional side view (along lines 13-13 in FIG. 9) of the lifter bar of FIGS. 9 to 12;

FIG. 13*b* is a simplified version of FIG. 13*a;*

Figure 14A:
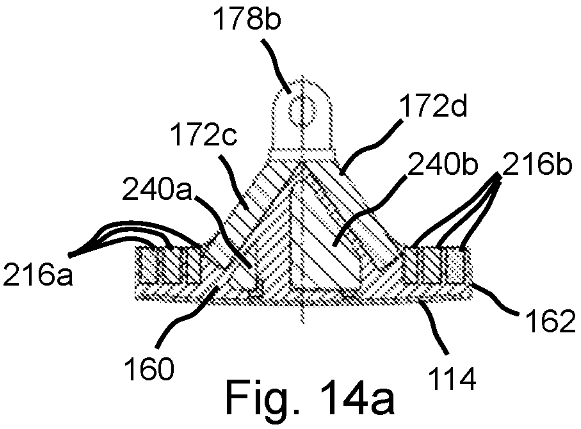
Figure 14B:
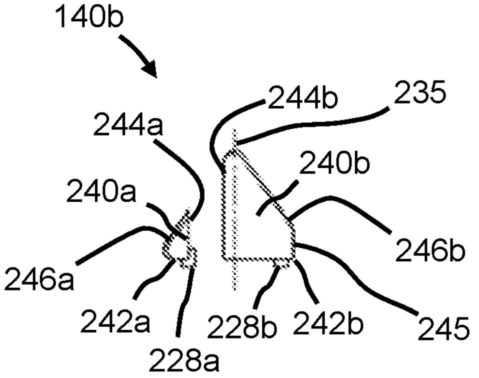

FIG. 14*a* is a simplified, schematic cross-sectional side view (along lines 14-14 in FIG. 9) of the lifter bar of FIGS. 9 to 12;

FIG. 14*b* is a simplified version of FIG. 14*a;*

Figure 15:
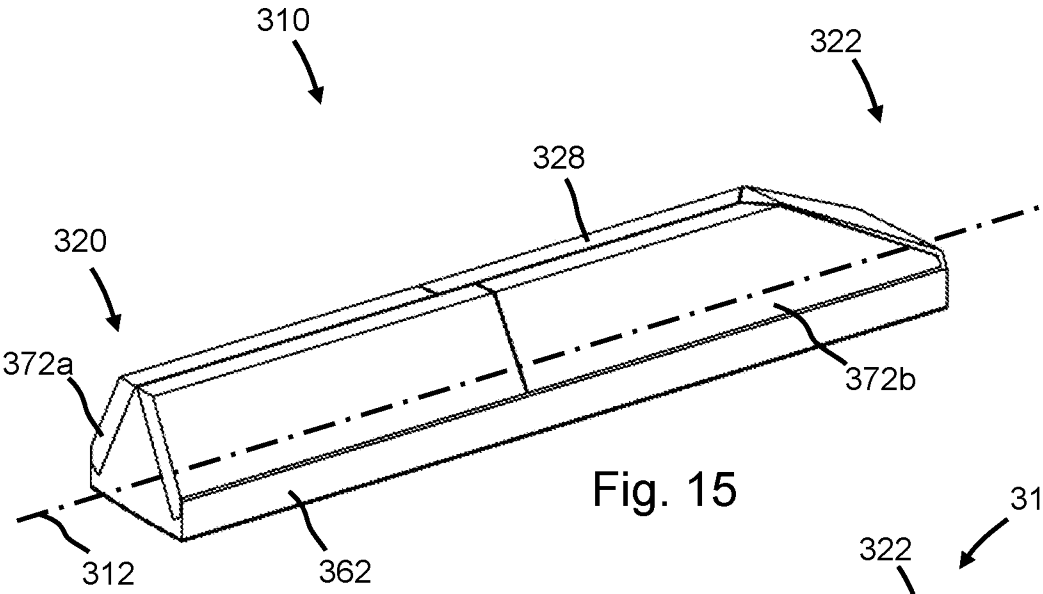
Figure 16:
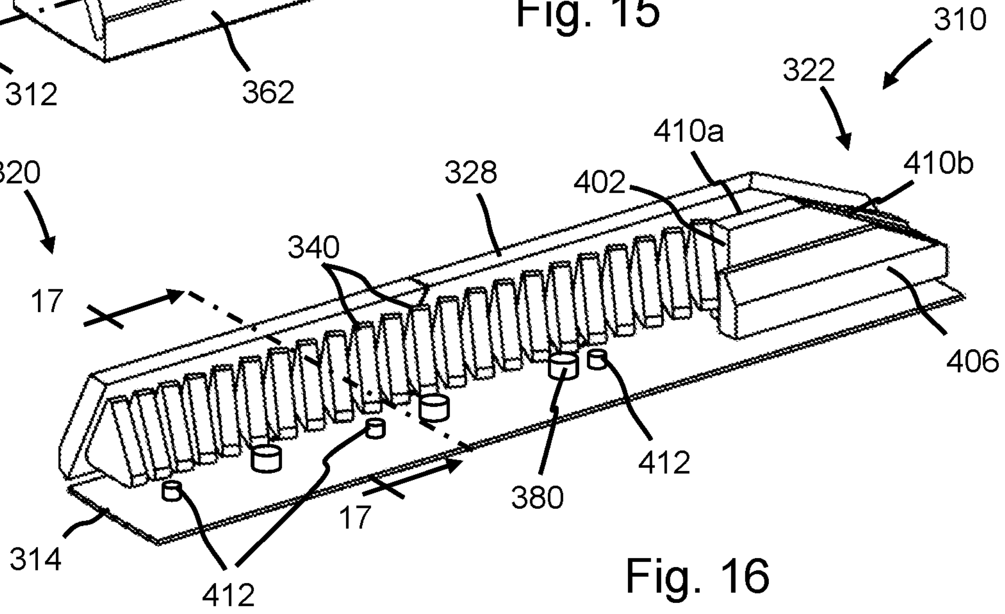
Figure 17:
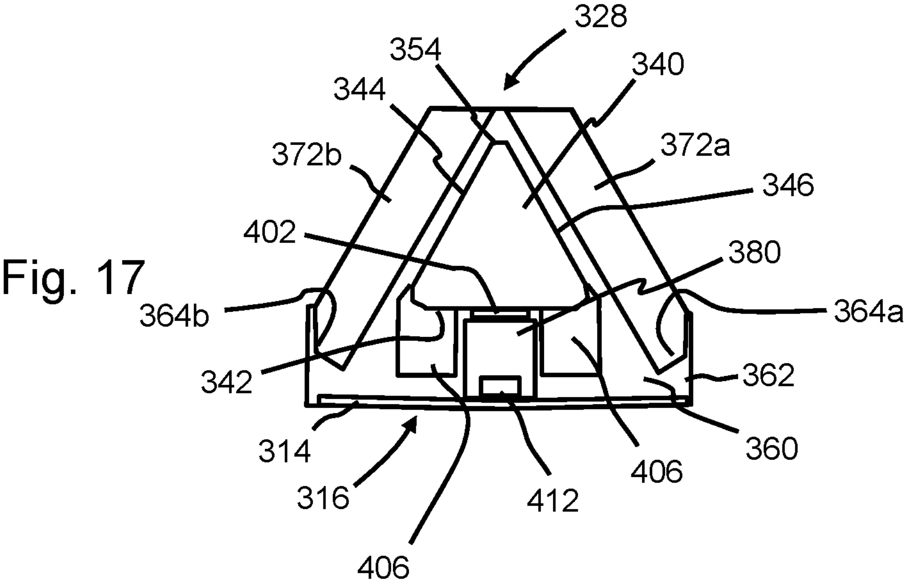
Figure 18:
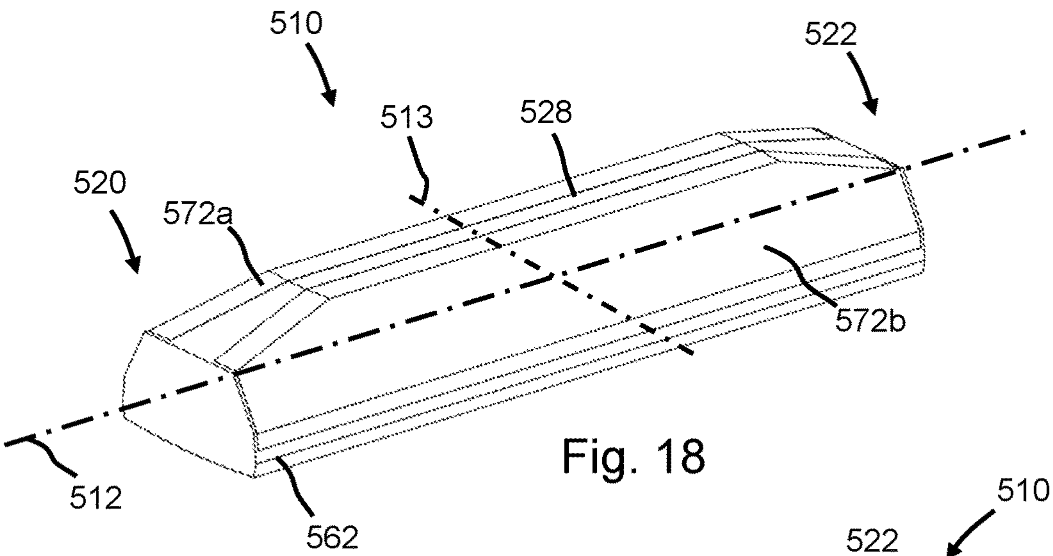
Figure 19:
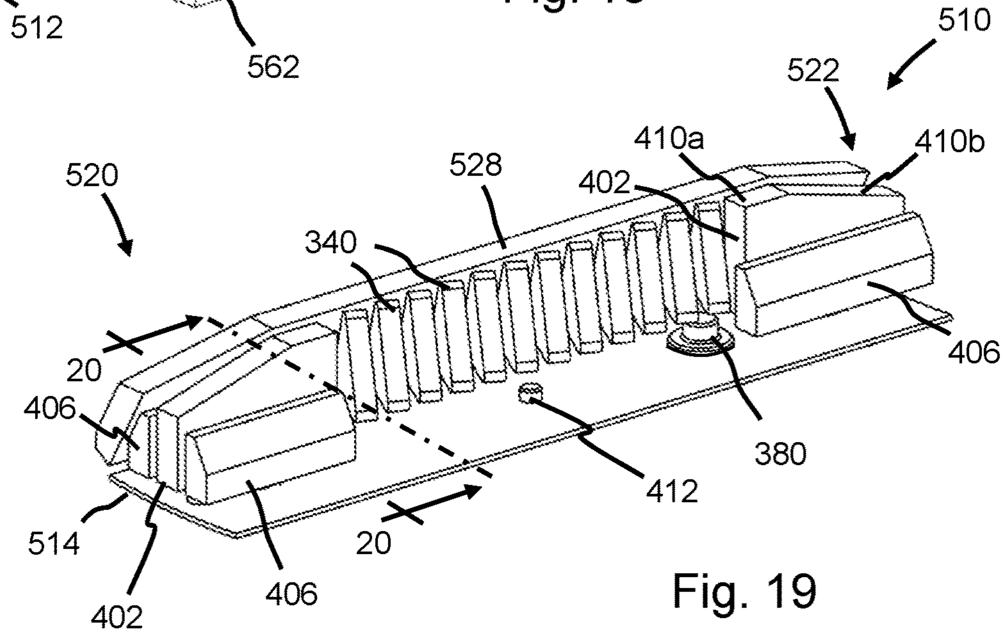
Figure 20:
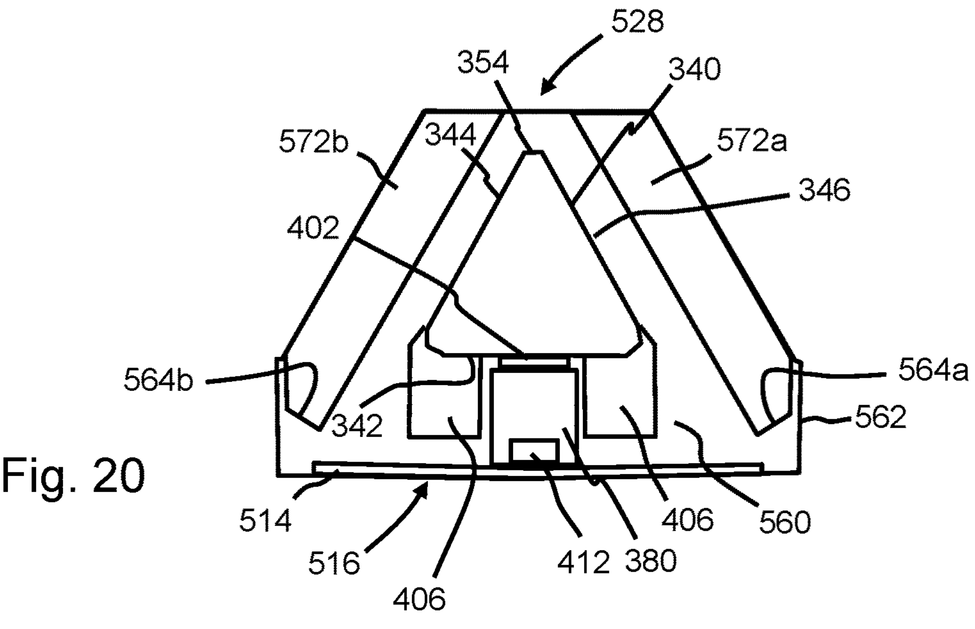
Figure 21:
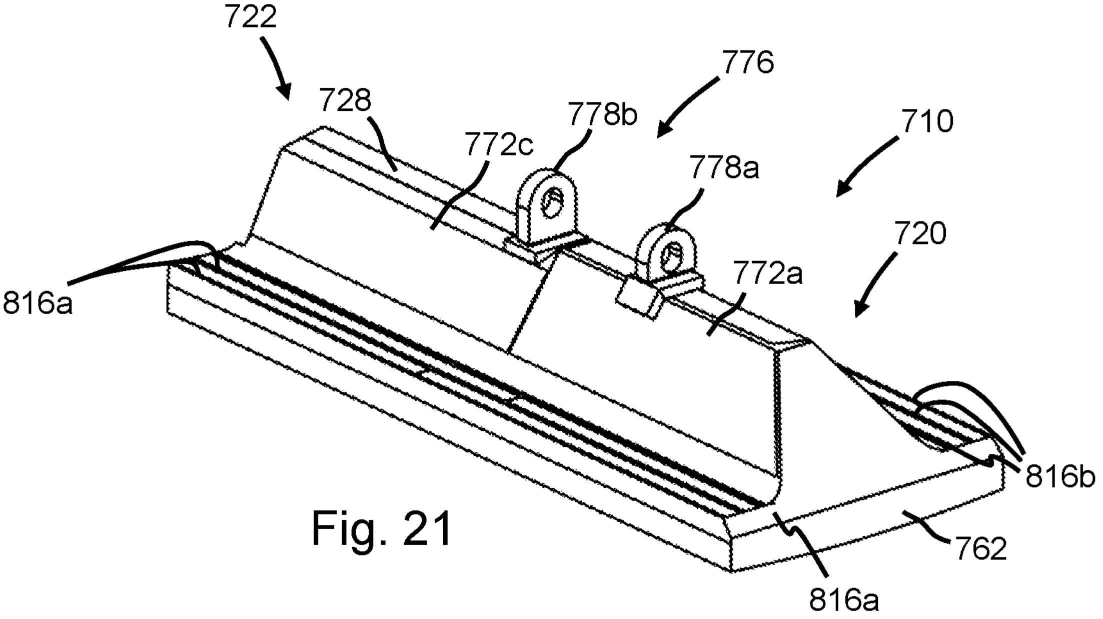
Figure 22:
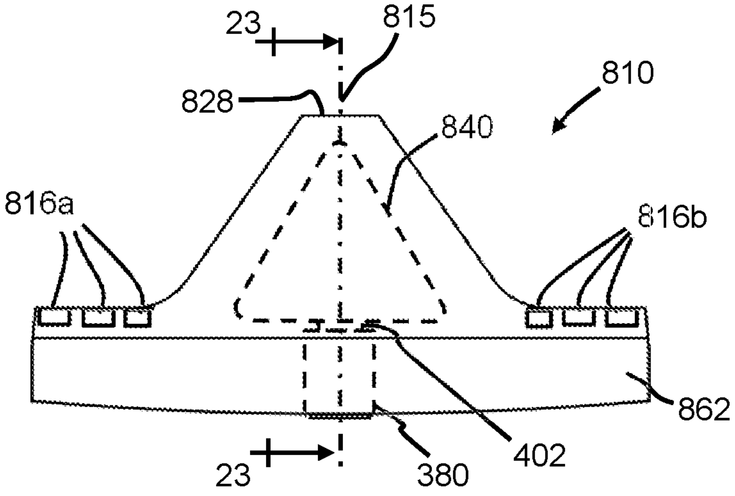
Figure 23:
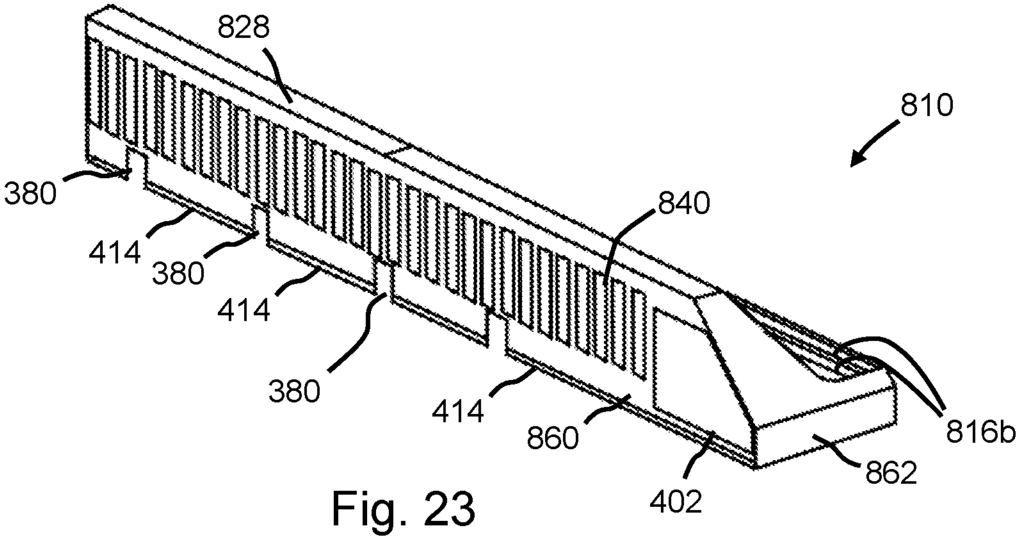
Figure 24:
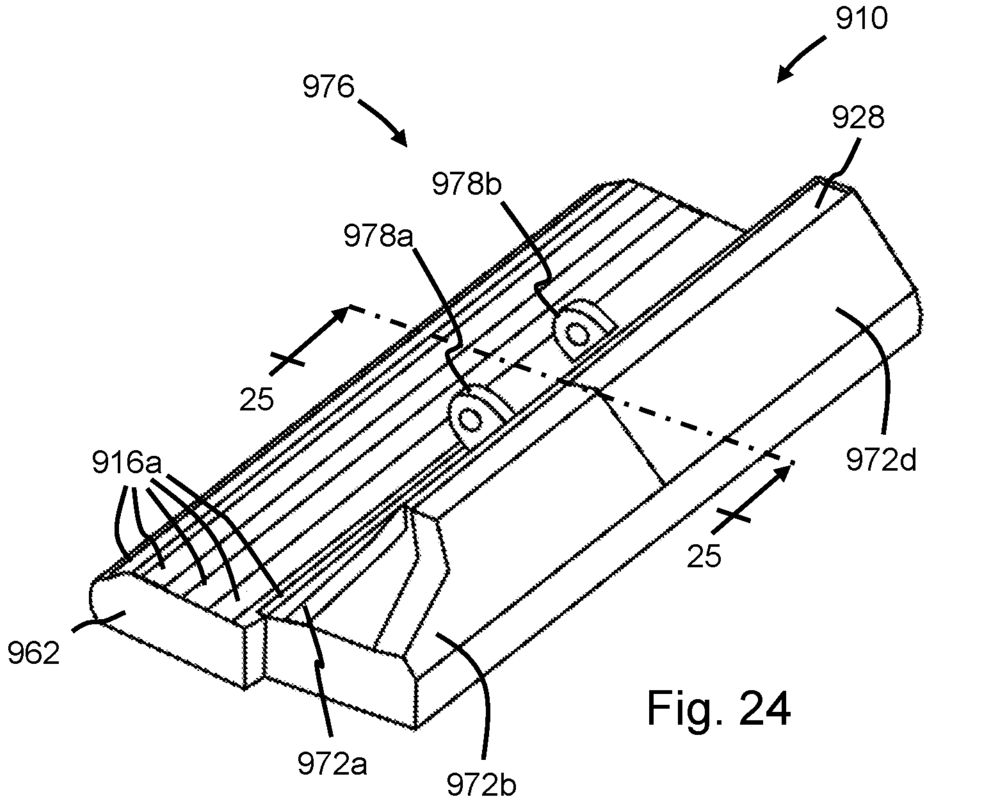
Figure 25:
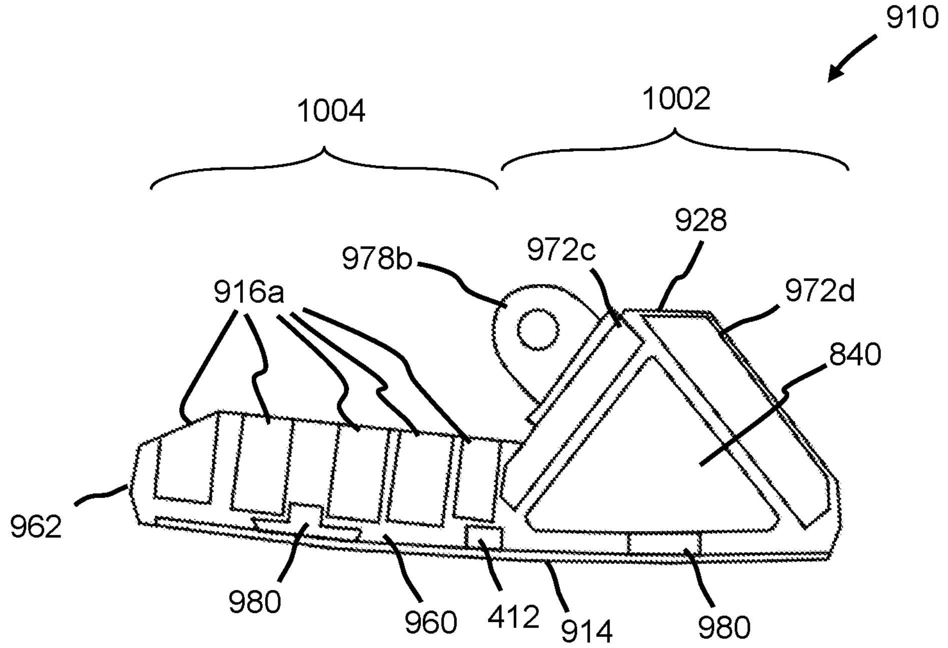

FIG. 15 is a simplified, schematic perspective view of a lifter bar according to a fourth embodiment of the present invention;

FIG. 16 is a partially cut away perspective view of the lifter bar of FIG. 15 illustrating internal details thereof;

FIG. 17 is a simplified cross-sectional side view (along lines 17-17 in FIG. 16, but with no hatching) of the lifter bar of FIGS. 15 and 16;

FIG. 18 is a simplified, schematic perspective view of a lifter bar according to a fifth embodiment of the present invention;

FIG. 19 is a partially cut away perspective view of the lifter bar of FIG. 18 illustrating internal details thereof;

FIG. 20 is a simplified cross-sectional side view (along lines 20-20 in FIG. 19, but with no hatching) of the lifter bar of FIGS. 18 and 19;

FIG. 21 is a simplified, schematic perspective view of a lifter bar according to a sixth embodiment of the present invention;

FIG. 22 is a simplified end view of a lifter bar according to a seventh embodiment of the present invention;

FIG. 23 is a partially cut away perspective view of the lifter bar of FIG. 22 (along line 23-23 in FIG. 22) illustrating internal details thereof;

FIG. 24 is a simplified perspective view of a lifter bar according to an eighth embodiment of the present invention; and FIG. 25 is a simplified cross-sectional side view (along lines 25-25 in FIG. 24, but with no hatching) of the lifter bar of FIG. 24.

Reference is first made to FIGS. 1 to 7, which are simplified, schematic views of a lifter bar 10 according to a first embodiment of the present invention. The lifter bar 10 is for use in a grinding mill (not shown in FIGS. 1 to 7). The lifter bar 10 defines a longitudinal axis 12 and comprises an elongate structural support 14 in the form of a rigid base comprising a structural steel sheet extending almost the entire length of the lifter bar 10 and located at an underside 16 of the lifter bar 10.

In this embodiment, the lifter bar 10 is approximately 3 metres long, 50 cm wide, and 64 cm high; although the dimensions of the lifter bar 10 may be selected to suit any particular grinding mill or other application.

The elongate structural support 14 extends from a first end 20 transverse to the longitudinal axis 12 to a second end 22 transverse to the longitudinal axis 12. In this embodiment, the first end 20 comprises an upright portion 24 and a sloping portion 26; although in other embodiments a different profile may be defined by the first end 20. The upright portion 24 extends from the underside 16 to the sloping portion 26; and the sloping portion 26 extends from a top of the upright portion 24 to an upper surface 28. In this embodiment, the first end 20 is oriented at a small angle x (approximately 10 degrees in this embodiment) to a plane 30 normal to the longitudinal axis 12; although in other embodiments the first end 20 may be oriented normal to the longitudinal axis 12, or at a different angle than 10 degrees.

The second end 22 also comprises an upright portion 34 and a sloping portion 36, although the sloping portion 36 of the second end 22 is much steeper than the sloping portion 26 of the first end 20. In this embodiment, the second end 22 is oriented at a small angle y (approximately 5 degrees in this embodiment) to the normal plane 30; although in other embodiments the second end 22 may be oriented normal to the longitudinal axis 12, or at a different angle to 5 degrees. The first and second ends 20, 22 may each be oriented at a different angle or the same angle.

The lifter bar 10 further comprises a plurality of structural plates 40 extending along the longitudinal axis 12 in spaced relation. Each structural plate 40 (best seen in FIGS. 6 and 7) comprises anti-abrasive steel and is oriented transverse to the longitudinal axis 12 (in this embodiment generally perpendicular thereto, that is, the main surfaces are parallel to normal plane 30; but the structural plates may also be provided at a small angle to a plane normal to the longitudinal axis, for example between one and ten degrees). Each structural plate 40 defines a plate base 42 and a pair of plate sidewalls 44,46, each comprising an upright portion 50*a,b* and a sloped portion 52*a,b* (the sloped portions 52 defining opposed edges that meet (or come close) at a plate peak or top 54).

The structural plates 40 are mounted on a pair of support rails 56 resting on the elongate structural support 14 and extending along the longitudinal axis 12. The support rails 56 maintain the structural plates 40 in an upright orientation and spaced from each other and the elongate structural support 14.

An elastomeric enclosure 60 (formed, for example, of vulcanized rubber) surrounds the structural plates 40 and support rails 56 and partially surrounds the elongate structural support 14 (but not an underside thereof). The elastomeric enclosure 60 provides flexible support for the transverse structural plates 40 and the elongate structural support 14, and resistance to wear when the lifter bar 10 is located within a grinding mill.

In this embodiment, the elastomeric enclosure 60 forms the upright portions 24,34 and sloping portions 26,36 of the first and second ends 20,22. The elastomeric enclosure 60 also defines a bumper portion 62 extending around the lifter bar 10 at a lower part thereof. The bumper portion 62 is essentially a continuation of the upright portions 24,34 along each of the longitudinal sides of the lifter bar 10. The bumper portion 62 defines a pair of backward sloping surfaces 64*a,b* (best seen in FIG. 7*a*) on each of the longitudinal sides of the lifter bar 10. The elastomeric enclosure 60 also defines a pair of longitudinal support surfaces 66*a,b* extending from an inner portion of the backward sloping surface 64*a,b* to the plate peak (or top) 54.

Each backward sloping surface 64*a,b* and its respective longitudinal support surface 66*a,b* defines a cover plate recess 68*a,b*.

Two protective plate portions (in the form of anti-abrasive steel covers) 72*a,b* are mounted in the cover plate recesses 68*a,b* to provide a high degree of protection against wear when the lifter bar 10 is used in a grinding mill.

The anti-abrasive steel covers 72*a,b* include a chamfered edge at an upper surface thereof, so that the covers 72*a,b* meet at an upper portion of the lifter bar 10 to define the upper surface 28.

A handle 76 (made from steel in this embodiment) is securely mounted on the upper surface 28 and includes a pair of lifting eyelets 78*a,b* spaced apart by a steel support plate. Crane hooks (not shown) can be inserted into the eyelets 78*a,b* to raise the lifter bar 10 so that it can be manoeuvred into place in a grinding mill.

Threaded recesses (or bores) 80 are defined by the lifter bar 10, particularly by the underside 16, the structural steel sheet 14 (which includes a tapped hole), and the elastomer enclosure 60, to enable mountings (such as bolts or screws) in a grinding mill (not shown) to be used to secure the lifter bar 10 in place. Although four recesses 80 are illustrated in FIG. 3, any suitable number of recesses may be used.

Reference is now made to FIG. 8 which is a simplified, schematic side view of a grinding mill shell 90 including a plurality of circumferentially spaced lifter bars 10 and conventional elastomeric spacer bars (also referred to as liner assemblies or shell liners) 92 mounted on an inner surface thereof. The grinding mill shell 90 is controlled by conventional electro-mechanical components used for conventional grinding mills. The operation of the grinding mill is very similar to the operation of a conventional grinding mill; although grinding mill shell 90 has the advantage that the lifter bars 10 include the transverse plates 40 for additional support during operation thereof. For clarity, in FIG. 8 the size of the lifter bars 10 and shell liners 92 have been greatly increased compared with the size of the grinding mill shell 90.

Reference is now made to FIGS. 9 to 14, which are simplified, schematic diagrams of a lifter bar 110 (a so-called monoblock bar) according to another embodiment of the present invention. Those parts of the lifter bar 110 that correspond to parts of the lifter bar 10 have the same reference number but with one hundred added thereto and start with a one, for example, elongate structural support 114 corresponds to elongate structural support 14. Three digit reference numerals starting with a two (for example, front portion 210) may not correspond exactly to any feature in the first embodiment.

In this embodiment, the lifter bar 110 is approximately 2.5 metres long, 1 m wide, and 46 cm high; although the dimensions of the lifter bar 110 may be selected to suit any particular grinding mill.

In general, the lifter bar 110 comprises a central section 200 similar to lifter bar 10 but with dual (differential) heights and lateral protrusions.

The lifter bar 110 defines a longitudinal axis 112 and comprises an elongate structural support 114 in the form of a rigid base comprising a structural steel sheet extending almost the entire length of the lifter bar 110 and located at an underside 116 of the lifter bar 110. The elongate structural support 114 is wider than corresponding structural support 14.

The lifter bar 110 comprises a front portion 210 higher than a rear portion 212. A front eyelet 178*a* (mounted on the front portion 210) is shorter than a rear eyelet 178*b* (mounted on the rear portion 212), so that the apertures defined by the eyelets 178*a,b* are horizontally aligned when the lifter bar 110 is resting on a level surface.

Elastomeric enclosure 160 is similar to elastomeric enclosure 60, but it extends laterally defining wing portions 214*a,b* on either side of the central section 200. Elastomeric enclosure 160 also includes a raised bumper portion 162 higher than the corresponding bumper portion 62 in the first embodiment.

The lifter bar 110 comprises a paired row of transverse structural supports 140, rather than the single row of transverse structural supports 40 of the first embodiment. Furthermore, the front portion 210 has a slightly different arrangement of transverse structural plates 140*a* from the rear portion 212 structural plates 140*b*. The front portion 210 comprises two sets of transverse structural plates, each set extending along the longitudinal axis 112 in spaced relation (best seen in FIG. 13*b*). The first set of support plates 220*a* (best seen in FIG. 13*b*) comprises anti-abrasive steel. Each structural plate 220*a* defines a plate base 222*a*, an upright (vertical or near vertical in this embodiment) sidewall 224*a*, and a sloping sidewall 226*a* curving near the base 222*a* and connecting the base 222*a* to the upright sidewall 224*a*. The first set of support plates 220*a* is mounted on a support rail 228*a*.

The second set of support plates 220*b* (best seen in FIG. 13*b*) also comprises anti-abrasive steel. Each structural plate 220*b* defines a plate base 222*b*, an upright sidewall 224*b* aligned with a centreline 235, and a sloping sidewall 226*b*. The second set of support plates 220*b* is also mounted on a support rail 228*b*.

The rear portion 212 also comprises two sets of transverse structural plates 240*a,b*, each set extending along the longitudinal axis 112 in spaced relation. The first set of support plates 240*a* (best seen in FIG. 14*b*) comprises anti-abrasive steel. Each structural plate 240*a* defines a plate base 242*a*, an upright (vertical or near vertical in this embodiment) sidewall 244*a*, and a sloping sidewall 246*a*. Structural plate 240*a* is a slightly smaller version of structural plate 220*a*. Structural plates 240*a* are mounted on the support rail 228*a*.

The second set of support plates 240*b* (best seen in FIG. 14) also comprises anti-abrasive steel. Each structural plate 240*b* defines a plate base 242*b*, an upright sidewall 244*b* extending from one side of the base 242*b*, a stub sidewall 245 extending from the opposite side of the base 242*b*, and a sloping sidewall 246*b* connecting the stub sidewall 245 to the upright sidewall 244*b*. The upright sidewall 244*b* is located beyond the centreline 235 of the lifter bar 110. Having the second set of support plates 240*b* in the rear portion 212 offset from the second set of support plates 220*b* in the front portion 210 has the advantage that torsional effects are reduced. The second set of support plates 240*b* is also mounted on the support rail 228*b*.

In a similar manner as for the first embodiment, the support rails 228 maintain the structural plates 140*a,b* in an upright orientation and spaced from each other and the elongate structural support 114.

Four protective plate portions (in the form of anti-abrasive steel covers) 172*a,b,c,d* are mounted in the cover plate recesses defined by the elastomeric enclosure 160 (in a similar way to the first embodiment) to provide a high degree of protection against wear when the lifter bar 110 is used in a grinding mill.

The elastomeric enclosure 160 is formed of vulcanized rubber and surrounds the structural plates 140*a,b* and support rails 228 and partially surrounds the elongate structural support 114 (but not an underside thereof). The elastomeric enclosure 160 provides flexible support for the transverse structural plates 140*a,b* and the elongate structural support 114, and resistance to wear when the lifter bar 110 is located within a grinding mill.

The wing portions 214*a,b* on either side of the central section 200 each include three anti-abrasive strips of metal (steel in this embodiment) 216*a,b* extending for the length of the lifter bar 110 to provide further protection against abrasion and wear when the lifter bar 110 is used in a grinding mill.

Reference is now made to FIGS. 15 to 17, which are simplified, schematic views of a lifter bar 310 according to another embodiment of the present invention. The lifter bar 310 defines a longitudinal axis 312 and comprises an elongate structural support 314 in the form of a rigid base comprising a structural steel sheet extending almost the entire length of the lifter bar 310 and located at an underside 316 of the lifter bar 310.

Those parts of the lifter bar 310 that correspond to parts of the lifter bar 10 have the same reference number but with three hundred added thereto and start with a three, for example, elongate structural support 314 corresponds to elongate structural support 14. Three digit reference numerals starting with a four (for example, central support 402) may not correspond exactly to any feature in the first embodiment.

The elongate structural support 314 extends from a first (upright) end 320 transverse to the longitudinal axis 312 to a second end 322 transverse to the longitudinal axis 312. In other embodiments a different profile may be defined by the first end 320. The second end 322 comprises an upright portion 334 and a sloping portion 336. In some embodiments, the first and second ends 320,322 may define the same profile (i.e. they may be mirror images of each other).

The lifter bar 310 further comprises a plurality of structural plates 340 extending along the longitudinal axis 312 in spaced relation. Each structural plate 340 (best seen in FIG. 17) comprises anti-abrasive steel (in other embodiments, structural steel or another alloy or metal may be used) and is oriented transverse to the longitudinal axis 312 (in this embodiment at an angle of approximately seven degrees thereto, that is, the main surfaces of each structural plate 340 are at an angle of approximately seven degrees to the longitudinal axis 312). In this embodiment, all of the structural plates 340 are at the same orientation angle, although in other embodiments, the orientation angle may increase slightly towards the second end 322.

Each structural plate 340 defines a plate base 342 and a pair of plate sidewalls 344,346 that meet (or come close) at a plate peak or top 354. The height of the structural plate 340 is approximately 55% of the height of the lifter bar 310 (from the underside 316 to the upper surface 328). For optimal economy (to reduce the cost of the lifter bar), the structural plate 340 is preferably less than 60% of the height of the lifter bar 310, but greater than 25% of the height of the lifter bar 310 to provide structural rigidity thereto.

The structural plates 340 are mounted longitudinally along, but spaced from, the elongate structural support 314, and they extend along the longitudinal axis 312 from the first end 320 towards, but not reaching, the second end 322.

Unlike the lifter bar 10 of the first embodiment, the lifter bar 310 includes a central support 402 at the second end 322, and a pair of support arms 406 (made of anti-abrasive steel in this embodiment) mounted at the second end 322 on either side (longitudinally) of the central support 402. The central support 402 defines an upper surface 410 having a first portion 410*a* parallel to the upper surface 328, and a second portion 410*b* sloping at an angle parallel to the second end sloping portion 336. The support arms 406 and central support 402 provide additional support for the second end 322 of the lifter bar 310.

An upper, outer portion of each of the support arms 406 slopes inwardly (towards the longitudinal axis 312) at the same angle as the sidewalls 344,346 of the transverse structural plates 340.

In other embodiments, a support rail may be provided to maintain the structural plates 340 in an upright orientation and spaced from each other and the elongate structural support 314.

An elastomeric enclosure 360 (formed, for example, of vulcanized rubber) surrounds the structural plates 340 and partially surrounds the elongate structural support 314 (but not an underside thereof). The elastomeric enclosure 360 provides flexible support for the transverse structural plates 340 and the elongate structural support 314, and resistance to wear when the lifter bar 310 is located within a grinding mill. In this embodiment, the elastomeric enclosure 360 defines a bumper portion 362 extending around the lifter bar 310 at a lower part thereof.

Two protective plate portions (in the form of anti-abrasive steel covers) 372*a,b* are mounted in cover plate recesses (equivalent to cover plate recesses 68*a,b* in FIG. 7*a*) to provide a high degree of protection against wear when the lifter bar 310 is used in a grinding mill.

The anti-abrasive steel covers 372*a,b* include a chamfered edge at an upper surface thereof, so that the covers 372*a,b* meet at an upper portion of the lifter bar 310 to define the upper surface 328.

A handle may be coupled to the upper surface 328 to enable the lifter bar 310 to be raises so that it can be manoeuvred into place in a grinding mill.

Threaded bores 380 are defined by the underside 316 of the lifter bar 310 to enable mountings (such as bolts or studs) in a grinding mill (not shown) to be used to secure the lifter bar 310 in place. Although only three bores 380 are illustrated in FIG. 16, any suitable number of bores may be used, or alternative designs of fixtures may be used (such as a slot for receiving a T-shaped bolt).

Assembly fixtures (in the form of threaded holes) 412 are provided to hold an upper part of a mould used during manufacture of the lifter bar 310.

Reference is now made to FIGS. 18 to 20, which are simplified, schematic views of a lifter bar 510 according to another embodiment of the present invention. The lifter bar 510 is similar to lifter bar 310, but both the first and second ends 520, 522 are sloping by a similar amount such that lifter bar 510 is symmetrical about its longitudinal axis 512 and also a central axis 513 halfway along the longitudinal axis 512. In addition, the protective plate portions 572*a,b* do not meet at the upper surface 528 because part of the elastomeric enclosure 560 separates the opposing plate portions 572*a,b*, so that the plate portions 572*a,b* and the elastomeric enclosure 560 together form the upper surface 528.

The lifter bar 510 comprises an elongate structural support 514 in the form of a rigid base comprising a structural steel sheet extending almost the entire length of the lifter bar 510 and located at an underside 516 of the lifter bar 510.

Those parts of the lifter bar 510 that correspond to parts of the lifter bar 10 have the same reference number but with five hundred added thereto and start with a five, for example, elongate structural support 514 corresponds to elongate structural support 14.

The elongate structural support 514 extends from a first end 520 transverse to the longitudinal axis 512 to a second end 522 transverse to the longitudinal axis 512. Each end 520,522 comprises an upright portion 534 and a sloping portion 536.

The lifter bar 510 further comprises a plurality of structural plates 340 (identical to the structural plates 340 of FIGS. 15 to 17). An elastomeric enclosure 560 (formed, for example, of vulcanized rubber) surrounds the structural plates 340 and partially surrounds the elongate structural support 514 (but not the underside 516).

The elastomeric enclosure 560 provides flexible support for the transverse structural plates 340 and the elongate structural support 514, and resistance to wear when the lifter bar 510 is located within a grinding mill.

Unlike the lifter bar 310 of FIGS. 15 to 17, the lifter bar 510 includes two pairs of support arms 406, one pair mounted at each end 520,522 and on either side (laterally) of the longitudinal axis 512.

A handle may be coupled to the upper surface 528 to enable the lifter bar 510 to be raises so that it can be manoeuvred into place in a grinding mill.

Reference is now made to FIG. 21, which is a simplified, schematic diagram of a lifter bar 710 (a so-called monoblock bar) according to another embodiment of the present invention. Those parts of the lifter bar 710 that correspond to parts of the lifter bar 10 have the same reference number but with seven hundred added thereto and start with a seven, for example, upper surface 728 corresponds to upper surface 28.

Monoblock bar 710 is similar to monoblock bar 110 but only a single set of structural plates 740 is used, and these are held in place in a similar way to the structural plates 340. A central support 402 is also provided at one or both ends 720,722.

Reference is now made to FIGS. 22 and 23, which are simplified views (an end view and a cross-sectional perspective view, respectively) of a lifter bar 810 (also known as a monoblock bar) according to another embodiment of the present invention. Monoblock bar 810 is similar to monoblock bar 710 but is symmetric about a central (vertical) axis 815. Those parts of the lifter bar 810 that correspond to parts of the lifter bar 710 have the same reference number but with one hundred added thereto and start with an eight, for example, upper surface 828 corresponds to upper surface 728.

Reference is now made to FIGS. 24 and 25, which are simplified, schematic diagrams of a lifter bar 910 according to another embodiment of the present invention. Those parts of the lifter bar 910 that correspond to parts of the lifter bar 10 have the same reference number but with nine hundred added thereto and start with a nine, for example, upper surface 928 corresponds to upper surface 28.

The lifter bar 910 comprises a raised portion 1002 having a frusto-triangular shape, and a lateral portion 1004 extending from a lower side of the raised portion 1002.

The lifter bar 910 comprises an elongate longitudinal support 914. A plurality of structural plates 840 are mounted in spaced relation to an elongate longitudinal support 914, in a similar manner to the above embodiments.

The raised portion 1002 includes a handle 976 affixed to the protective plate portions 972*a,c* nearest the lateral portion 1004. The handle 976 comprises lifting eyelets 978*a,b* spaced apart by a steel support plate.

These embodiments have various advantages over the prior art. For example, the single or double row of transverse anti-abrasive plates inside the elastomeric material provide structural rigidity to the lifter bar. The wear resistance is primarily provided by the protective plates and the elastomeric material, since the transverse plates will not be in contact with the grinding balls (inside the mill).

Various modifications may be made to the above described embodiments within the scope of the present invention. For example, different profiles of ends may be provided than those described. The dimensions of the lifter bar, transverse plates, protective plates, longitudinal support, runners, and the like may be differ from those described above or illustrated in the drawings. In some embodiments, the transverse structural plates may not be made from anti-abrasive material, but from a material primarily chosen for its structural rigidity.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

LIST OF REFERENCE NUMERALS lifter bar 10, 110, 310, 510, 710, 810, 910
longitudinal axis 12, 112, 312, 512
elongate structural support 14, 114, 314, 514, 914
lifter bar underside 16, 116, 316, 516
first end 20, 120, 320, 520, 720
second end 22, 122, 322, 522, 722
first end upright portion 24
first end sloping portion 26
upper surface 28, 328, 528, 728, 828, 928
plane (normal to longitudinal axis) 30
second end upright portion 34, 334
second end sloping portion 36, 336
structural plates 40, 140*a,b*, 220*a,b*, 240*a,b*, 340, 740, 840
structural plate base 42, 222*a,b*, 242*a,b*, 342
structural plate sidewalls 44,46; 344, 346
structural plate sidewall upright portion 50*a,b*
structural plate sidewall sloped portion 52*a,b*
structural plate sidewall plate peak or top 54, 354
support rails 56
elastomeric enclosure 60, 160, 360, 560, 760, 860, 960
bumper portion 62, 162, 362, 562, 762, 862, 962
bumper portion backward sloping surfaces 64*a,b*; 364*a,b*
elastomeric enclosure longitudinal support surfaces 66*a,b*
cover plate recess 68*a,b*
protective plate portions 72*a,b*; 172*a,b,c,d*; 372*a,b*; 572*a,b*; 772*a,b,c,d*; 972*a,b,c,d* handle 76, 976
lifting eyelets 78*a,b*; 178*a,b*; 978*a,b*
threaded bores 80, 380, 980
grinding mill shell 90
elastomeric spacer bars (liner assemblies) 92
central section 200
front portion 210
rear portion 212
wing portions 214*a,b*
anti-abrasive strips of metal 216*a,b*, 816*a,b*; 916*a*
upright sidewall 224*a,b*, 244*a,b*
sloping sidewall 226,*b*, 246*a,b*
support rail 228*a,b* centreline 235
stub sidewall 245
central support 402
support arms 406
central support upper surface 410
central support first (parallel) portion 410*a*
central support second (sloping) portion 410*b*
assembly fixtures 412
central axis 513
central axis 815
raised portion 1002
lateral portion 1004

The invention claimed is:

1. A lifter bar for use in a grinding mill, the lifter bar comprising:

an elongate structural support defining a longitudinal axis and extending from (i) a first end transverse to the longitudinal axis to (ii) a second end transverse to the longitudinal axis;

a plurality of structural plates extending along the longitudinal axis in spaced relation, where each of the structural plates of the plurality of structural plates is transverse to the longitudinal axis, and each defines opposed edges; and an elastomer enclosure surrounding the plurality of structural plates and at least partially surrounding the elongate structural support, to prevent each of the structural plates of the plurality of structural plates from being directly impacted by a grinding medium when used in a grinding mill.

2. The lifter bar according to claim 1, wherein each structural plate of the plurality of structural plates is parallel to an adjacent structural plate.

3. The lifter bar according to claim 1, wherein each structural plate is oriented at an angle to a plane normal to the longitudinal axis, where the angle is greater than zero degrees and less than 16 degrees.

4. The lifter bar according to claim 1, wherein the elongate structural support comprises a rigid sheet including metallic material.

5. The lifter bar according to claim 1, further comprising at least two protective plate portions, each protective plate portion being mounted on the elastomer enclosure over one set of the structural plate opposed edges.

6. The lifter bar according to claim 1, wherein the lifter bar further comprises a central support at one end thereof, and being axially aligned with the longitudinal axis and extending therealong.

7. The lifter bar according to claim 6, further comprising a support arm adjacent the central support and extending parallel thereto in a longitudinal direction and by at least 30% of the height of the central support in a direction transverse to the longitudinal axis.

8. The lifter bar according to claim 1, wherein the structural plate opposed edges comprise one or more sloping edges, and wherein an upper surface is located where the opposed edges are closest together.

9. The lifter bar according to claim 1, wherein the plurality of structural plates define a first set of transverse structural plates, and the lifter bar further comprises a second set of transverse structural plates, where a transverse structural plate from the first set of transverse structural plates is aligned with a corresponding transverse structural plate from the second set of transverse plates in the same plane, but mutually spaced apart normal to the longitudinal axis.

10. The lifter bar according to claim 9, wherein the lifter bar further comprises first and second support rails on which the first set of transverse structural plates are mounted.

11. The lifter bar according to claim 9, wherein the first set of transverse structural plates are mounted on a first support rail and the second set of transverse plates are mounted on a second support rail.

12. The lifter bar according to claim 1, wherein the lifter bar comprises a front portion having a first height, and a rear portion having a second height, different from the first height.

13. The lifter bar according to claim 12, wherein the first front portion comprises one or two sets of transverse plates; the rear portion also comprises one or two sets of transverse plates; wherein the front and rear transverse plates are longitudinally aligned or longitudinally offset.

14. The lifter bar according to claim 1, wherein the lifter bar further comprises a first runner extending (i) outwardly from a lower part of a protective plate portion mounted over one set of the opposed edges and (ii) parallel to the longitudinal axis.

15. The lifter bar according to claim 14, wherein the lifter bar further comprises a second runner on an opposite side of the longitudinal axis to the first runner and extending (i) outwardly from a lower part of a protective plate portion mounted over another set of the opposed edges and (ii) parallel to the longitudinal axis.

16. The lifter bar according to claim 15, wherein the lifter bar further comprises one or more elongate, protective plate portions mounted on each runner to provide resistance to abrasion or other wear during use.

17. The lifter bar according to claim 1, wherein the elongate structural support defines recesses in a lower surface thereof into which couplings may be mounted to facilitate lifting the lifter bar or securing the lifter bar in place.

18. A grinding mill comprising:

(i) a shell, (ii) a plurality of lifter bars comprising:

an elongate structural support defining a longitudinal axis and extending from (i) a first end transverse to the longitudinal axis to (ii) a second end transverse to the longitudinal axis, a plurality of structural plates extending along the longitudinal axis in spaced relation, where each structural plate is transverse to the longitudinal axis, and defines opposed edges, and an elastomer enclosure surrounding the plurality of structural plates and at least partially surrounding the elongate structural support, to prevent the structural plates from being directly impacted by a grinding medium when in use, the plurality of lifter bars being mounted on an inner surface of the shell in circumferentially spaced relation, and (iii) at least one shell liner mounted between adjacent lifter bars.

19. The grinding mill according to claim 18, wherein the at least one shell liner defines an upper surface having a flat or arcuate shape.

20. The grinding mill according to claim 18, wherein the shell comprises mounting points on an outer surface thereof to secure the lifter bars to the shell.

* * * * *